United States Patent
Thomson et al.

(10) Patent No.: US 11,727,412 B2
(45) Date of Patent: Aug. 15, 2023

(54) SYSTEMS AND METHODS FOR OPTIMIZING TRANSACTION AUTHORIZATION REQUEST MESSAGE TO REDUCE FALSE DECLINES

(71) Applicant: MASTERCARD INTERNATIONAL INCORPORATED, Purchase, NY (US)

(72) Inventors: Brett J. Thomson, Lake St. Louis, MO (US); Kyle Williams, Wentzville, MO (US); David J. Senci, Troy, IL (US); Blake Gibbons, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 258 days.

(21) Appl. No.: 16/719,584

(22) Filed: Dec. 18, 2019

(65) Prior Publication Data

US 2021/0192532 A1 Jun. 24, 2021

(51) Int. Cl.
*G06Q 20/42* (2012.01)
*G06Q 20/38* (2012.01)
*G06Q 20/40* (2012.01)

(52) U.S. Cl.
CPC ........... *G06Q 20/42* (2013.01); *G06Q 20/388* (2013.01); *G06Q 20/401* (2013.01)

(58) Field of Classification Search
CPC ..... G06Q 20/42; G06Q 20/388; G06Q 20/401
See application file for complete search history.

(56) References Cited

U.S. PATENT DOCUMENTS

| | | |
|---|---|---|
| 8,646,685 B2 | 2/2014 | Bishop et al. |
| 8,794,509 B2 | 8/2014 | Bishop et al. |
| 8,814,039 B2 | 8/2014 | Bishop et al. |
| 9,727,869 B1 | 8/2017 | Matson et al. |
| 2015/0220920 A1 | 8/2015 | Howe |
| 2015/0379514 A1 | 12/2015 | Poole et al. |
| 2017/0076288 A1* | 3/2017 | Awasthi ............ G06Q 20/3821 |
| 2017/0228736 A1* | 8/2017 | Leyva .................. G06Q 20/027 |
| 2019/0147450 A1* | 5/2019 | Bharghavan ....... G06Q 20/4016 705/75 |
| 2019/0228411 A1* | 7/2019 | Hernandez-Ellsworth .................. G06F 16/25 |
| 2020/0058031 A1* | 2/2020 | Zhang .................... G06Q 20/42 |
| 2020/0151726 A1* | 5/2020 | Song .................. G06F 12/0875 |
| 2020/0302450 A1* | 9/2020 | Misra ................. G06Q 30/0185 |

(Continued)

*Primary Examiner* — Courtney P Jones
(74) *Attorney, Agent, or Firm* — Armstrong Teasdale LLP

(57) ABSTRACT

Described herein is a data optimization computer system for optimizing transaction authorization request messages directed to an authorizing party. The computer system includes a historical transaction database, a merchant database, and a data optimization computing device. The historical transaction database stores a plurality of historical transaction records. The merchant database stores a first merchant registered with the optimization computer system. The data optimization computing device may analyze at least a subset of the historical transaction records to generate a set of optimization rules. The set of optimization rules identifies optimal values for an optimized transaction authorization request message. The optimized transaction authorization request message may be associated with an improved likelihood of resulting in a positive request outcome.

21 Claims, 8 Drawing Sheets

(56) References Cited

U.S. PATENT DOCUMENTS

| | | | |
|---|---|---|---|
| 2020/0314101 A1* | 10/2020 | Zhang | G06N 3/08 |
| 2021/0103927 A1* | 4/2021 | Misra | G06Q 20/4016 |
| 2021/0125179 A1* | 4/2021 | Mach | G06N 7/005 |
| 2021/0243198 A1* | 8/2021 | Naumann Zu Koenigsbrueck | H04W 12/08 |
| 2021/0312286 A1* | 10/2021 | Shaik | G06N 3/0454 |

* cited by examiner

SYSTEMS AND METHODS FOR OPTIMIZING TRANSACTION AUTHORIZATION REQUEST MESSAGE TO REDUCE FALSE DECLINES

BACKGROUND

The field of the present disclosure relates generally to processing payment transactions over a payment network and, more particularly, to systems and methods for generating an optimized authorization request message for a payment transaction to increase the likelihood of a positive authorization request outcome from an authorizing party for genuine or non-fraudulent payment transactions.

At least some electronic payment transactions involve an exchange of an authorization request message between a merchant, an acquirer, and an issuer. This transaction authorization request message may include several transaction data fields, such as, but not limited to, transaction date-times, merchant identifiers, acquirer identifiers, point of service entry mode and transaction category codes. These data fields are populated with data and are transmitted over the payment network to the different parties involved in the payment transaction.

Moreover, at least some known issuers utilize fraud detection systems to detect potentially fraudulent transactions. These fraud detection systems may evaluate the values populating the transactions data fields of the authorization request messages, as well as one or more combinations of these values, to determine whether a transaction is likely fraudulent. At least some of these fraud detection systems result in a false identification of a non-fraudulent transaction as fraudulent, referred to as a "false negative" authorization request outcome. These false negative authorization request outcomes cause unnecessary inconvenience for the customer, the merchant, and the issuer, and lead to loss sales for merchants. Moreover, false negative authorization outcomes add unnecessary network traffic over a payment processing network, as consumers or merchants may attempt transactions multiple times.

In at least some other cases, fraud detection systems may include rules that are applied to payment transactions in order to determine whether they are fraudulent. In some cases, these rules may be coded improperly such that false negatives are routinely generated. Oftentimes, these improperly coded rules are difficult to detect.

BRIEF DESCRIPTION

In one aspect, a data optimization computer system for optimizing transaction authorization request message directed to an authorizing party is provided. The computer system includes a historical transaction database, a merchant database, and a data optimization computing device. The historical transaction database stores a plurality of historical transaction records associated with a respective plurality of initiated payment transactions. The merchant database stores a first merchant identifier for identifying a first merchant registered with the optimization computer system. The data optimization computing device includes at least one processor in communication with the historical transaction database and the merchant database. The data optimization computing device is configured to access the historical transaction database to retrieve at least a subset of the plurality of historical transaction records, and analyze the subset of the historical transaction records to generate a set of optimization rules. The set of optimization rules identifies optimal values for an optimized transaction authorization request message. The optimized transaction authorization request message is associated with an improved likelihood of resulting in a positive request outcome. The data optimization computing device is further configured to receive a current authorization request message associated with a current payment transaction. The current payment transaction has been initiated with the first merchant. The current authorization request message including a plurality of data fields, each data field including a current input value included in the plurality of data fields of the current authorization request message. The data optimization computing device is further configured to retrieve at least a subset of the set of optimization rules, generate an optimized authorization request message for the current payment transaction by applying the subset of the optimization rules to the current authorization request message, and transmit the optimized authorization request message to an authorizing party.

In another aspect, a computer-implemented method for optimizing transaction authorization request messages directed to an authorizing party is provided. The method is implemented using a data optimization computing device including a processor and a memory. The data optimization computing device is in communication with a historical transaction database and a merchant database. The method includes accessing the historical transaction database to retrieve at least a subset of a plurality of historical transaction records stored therein, and analyzing the subset of the historical transaction records to generate a set of optimization rules. The set of optimization rules identifies optimal values for an optimized transaction authorization request message, wherein the optimized transaction authorization request message is associated with an improved likelihood of resulting in a positive request outcome. The method further includes receiving a current authorization request message associated with a current payment transaction. The current payment transaction has been initiated with a first merchant, and the current authorization request message includes a plurality of data fields, each data field including a current input value included in the plurality of data fields of the current authorization request message. The method further includes retrieving at least a subset of the set of optimization rules, generating an optimized authorization request message for the current payment transaction by applying the subset of the optimization rules to the current authorization request message, and transmitting the optimized authorization request message to an authorizing party.

In yet another aspect, a non-transitory computer-readable storage medium that includes computer-executable instructions for dynamically optimizing transaction authorization request messages directed to an authorizing party is provided. When executed by a data optimization computing device comprising a processor in communication with a memory device, the computer-executable instructions cause the processor to access a historical transaction database, which stores a plurality of historical transaction records associated with a respective plurality of initiated payment transactions, to retrieve at least a subset of the plurality of historical transaction records, and analyze the subset of the historical transaction records to generate a set of optimization rules, wherein the set of optimization rules identifies optimal values for an optimized transaction authorization request message. The optimized transaction authorization request message is associated with an improved likelihood of resulting in a positive request outcome. Further, the computer-executable instructions cause the processor to receive a current authorization request message associated with a current payment transaction, the current payment transaction having been initiated with a first merchant. The current authorization request message includes a plurality of data fields, each data field including a current input value included in the plurality of data fields of the current authorization request message. The computer-executable instructions also cause the processor to retrieve at least a subset of the set of optimization rules, generate an optimized authorization request message for the current payment transaction by applying the subset of the optimization rules to the current authorization request message, and transmit the optimized authorization request message to an authorizing party.

BRIEF DESCRIPTION OF THE DRAWINGS

FIG. 1 is a simplified schematic diagram of an example process flow between components of a data optimization system including a data optimization computing device for optimizing a transaction authorization request message;

FIG. 2 is a simplified schematic diagram depicting generation of a merchant database by the data optimization computing device shown in FIG. 1;

FIG. 3 is a simplified schematic diagram depicting generation of a historical transaction database by the data optimization computing device shown in FIG. 1;

FIG. 4 is a process flow diagram of an example of a back-end development process for generating a set of optimization rules used to optimize an incoming or current transaction authorization request message;

FIG. 5 illustrates an example configuration of the data optimizing computing device shown in FIG. 1;

FIG. 6 is an illustration of the data optimization computing device shown in FIG. 1 optimizing an ongoing payment transaction;

FIG. 7 illustrates optimization of a current transaction authorization request message; and FIG. 8 depicts a process for generating an optimized transaction authorization request message.

DETAILED DESCRIPTION

Figure 1:
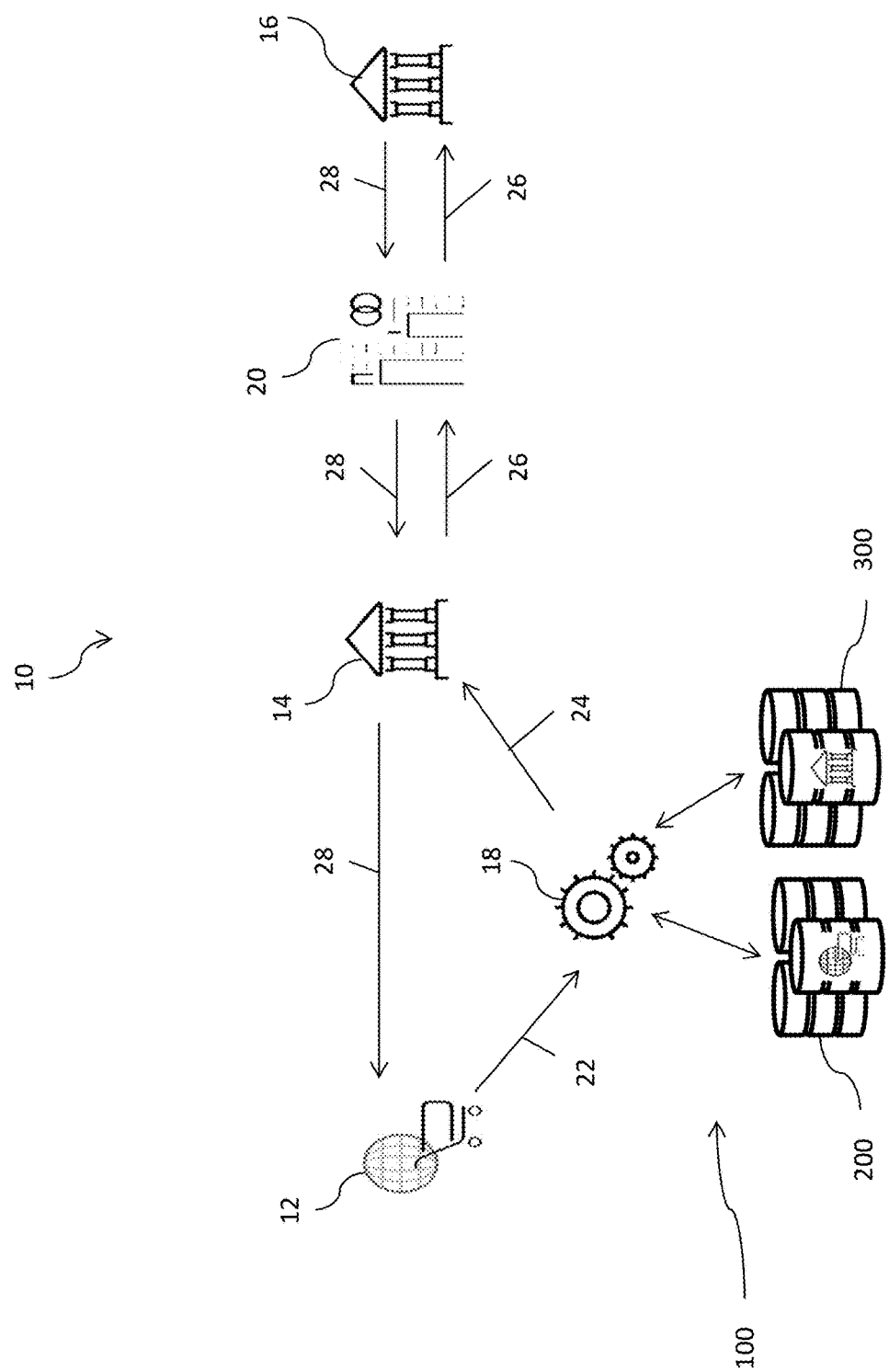
FIGS. 1-8 show example embodiments of the methods and systems described herein.

The systems and methods described herein are directed to dynamically generating an optimized transaction authorization request message prior to submitting the transaction authorization request message to an authorizing party. At least some payment transactions involve an exchange of a transaction authorization request message between a merchant, an acquirer, and an issuer (e.g., authorizing party). A customer (also referred to herein as a payor, user, or cardholder) initiates a current purchase transaction (also referred to as a "payment transaction") by providing their payment credentials (e.g., a credit or debit card number, a bank account number, primary account number (PAN), user log-in information corresponding to saved payment credentials, digital wallet information, etc.) to a merchant for the exchange of goods and services. The merchant may utilize a point of sale terminal or other payment interface (e.g., a virtual payment interface) to collect and record information associated with the current payment transaction. The point of sale terminal or payment interface provides a form or interface to facilitate entry of payment transaction details, and provide access to secure payment services (e.g., conversion of payment details to secure ISO 8583 or ISO 20022 message formats for processing over a dedicated payment processing network).

The merchant uses the collected and recorded information associated with the current payment transaction to generate a transaction authorization request message that includes a plurality of merchant transactions data fields. Each merchant transaction data field is populated with a respective merchant value based on the details of the current payment transaction. The merchant transaction data fields may include, for example and without limitation, initiating account number, PAN, merchant identifier, merchant name, merchant category code (MCC), transaction type, entry mode, date-time, and the like. A transaction authorization request message may include the plurality of merchant transaction data fields populated with merchant transaction values associated with the current payment transaction.

The merchant transaction data fields may be categorized into at least one of an immutable data field and an optimizable data field. The immutable data fields may be populated with an immutable value, and the immutable values may not be altered or adjusted without changing the accuracy of the transaction authorization request message. For example, immutable transaction data fields may include transaction dates-times. The optimizable data fields may each be populated with one of a plurality of acceptable values that can be interchanged within an optimizable field without changing the accuracy of the transaction authorization request message. For example, a payment transaction occurring online and scheduled for recurring periodic payment, may generate a transaction authorization request message that includes a merchant transaction data field of "Merchant Category Code" or "MCC". In this example, because the transaction is occurring online the transaction may be considered an "e-transaction." In addition, because this example payment transaction is also scheduled for recurring payments, the payment transaction may also be considered a "recurring transaction." Thus, the "MCC" data field of the transaction authorization request message may be populated with a value representing at least one of "e-transaction" and "recurring transaction." The accuracy of the transaction authorization request message is unchanged whether the "MCC" data field is populated with either one of "recurring transaction" or "e-transaction". In this example, the "MCC" data field is categorized as an optimizable field, and the values representing "recurring transaction" and "e-transaction" are acceptable values associated with the "MCC" data field.

In the present disclosure, values, such as acceptable values, optimal values, and immutable values may include any data type. For example, values may refer to numeric strings, character strings, composite type strings, and/or Boolean values.

In the example embodiment, the merchant transmits the transaction authorization request message to an authorizing party, such as an issuer, via a payment processing network. At least some authorizing parties implement fraud detection algorithms that utilize the merchant transaction data fields and associated merchant transaction values contained in the transaction authorization request messages to detect and prevent fraudulent transactions. At least some genuine or non-fraudulent transactions are falsely identified as fraudulent transactions by these fraud detection algorithms, leading to false negative authorization request outcomes (e.g., false declines).

A variety of factors may cause a fraud detection algorithm to generate a false decline. For example, a merchant may add a new merchant transaction data field to their transaction authorization request messages. Fraud detection algorithms may be intermittently updated, and a fraud detection algorithm implemented at an issuer that receives a transaction authorization request message that includes the new merchant transaction data field may not be capable of accepting or recognizing these new merchant transactions data fields. Fraud detection algorithms that are not capable of accepting or recognizing merchant transactions data fields and values populating these fields may result in an increased likelihood of false negative outcomes.

To reduce the incidence of false declines, the present disclosure relates generally to a data optimization system and methods for dynamically generating an optimized transaction authorization request message. "Dynamic" generation of an optimized transaction authorization request message refers to substantially real-time generation (e.g., on-the-fly or while the payment transaction is being processed over the payment network) of an optimized transaction authorization request message while a current payment transaction is occurring. A "current" payment transaction refers to a substantially real-time payment transaction (e.g., on-the-fly). The data optimization system transforms the current transaction authorization request message into an "optimized" transaction authorization request message using a set of optimization rules. The optimization rules identify an optimal value from a plurality of acceptable values to populate each of the optimizable data fields contained within the current transaction authorization request message. The optimized transaction authorization request message is associated with an increase in the likelihood of receiving a positive authorization request outcome message from an authorizing party.

False declines lead to technical problems such as increased network traffic as merchants and consumers attempt to repeat a payment transaction after receiving a false decline. In addition, transforming a current transaction authorization request message to an optimized transaction authorization request message in real time (e.g., while a consumer and merchant are waiting on the processing of the payment transaction) necessitates a fast optimization process that "on-the-fly" transforms the current transaction authorization request message to an optimized transaction authorization request message.

A technical effect of the systems and processes described herein include at least one of: (i) real-time application of optimization rules to dynamically generate an optimized transaction authorization request message (e.g., "on-the-fly"); (ii) decrease in non-fraudulent transaction declines thereby improving both the customer and merchant experience, and (iii) reduced network traffic associated with false declines for repeated transactions.

The technical effects of the systems and methods described herein may be achieved by performing at least some of the following steps: (i) generating a list of rules based on historical transactions, that may be used by the data optimization system to transform a current transaction authorization request message into an optimized transaction authorization request message, (ii) generating a merchant database to store merchant records associated with a payment transaction, (iii) receiving a current transaction authorization request message, (iv) transforming the current transaction authorization request message into an optimal transaction authorization request message, and (v) transmitting the optimized transaction authorization request message to an authorizing party.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example process flow 10 using a data optimization system 100 in accordance with the present disclosure. The example process flow 10 includes the transfer of a plurality of messages associated with a payment transaction between a merchant 12, an acquirer 14, an issuer 16, and a data optimization computing device 18 over a payment processing network 20. Data optimization computing device 18 is communicatively coupled to a merchant database 200 (shown in further detail in FIG. 2) and a historical transaction database 300 (shown in further detail in FIG. 3).

Merchant database 200 includes merchant records obtained from a merchant (e.g., merchant 12) registered with data optimization system 100. Each merchant record includes data specific to a particular merchant and transaction authorization request messages generated thereby, including immutable data fields, optimizable data fields, and a plurality of acceptable values that may be used to populate each of the optimizable data fields.

Historical transaction database 300 includes a plurality of historical initiated payment transaction records, and each historical initiated payment transaction record includes transaction data and a historical transaction authorization request outcome message associated with a respective initiated payment transaction. Each historical initiated payment transaction record is associated with a particular authorizing party (e.g., issuer 16) that processed the respective initiated payment transaction. Data optimization computing device 18 may store all historical initiated payment transaction records associated with a particular authorizing party at a particular storage location in historical transaction database 300. For example, data optimization computing device 18 may index the historical initiated payment transaction records by authorizing party. Additionally or alternatively, the data optimization computing device 18 may accumulate and/or aggregate a plurality of historical initiated payment transaction records associated with one authorizing party into a single file or data table. The historical initiated payment transaction records may be received from acquirers 14, issuers 16, and/or payment processing network 20. In other words, historical transaction database 300 includes each historical authorization request message including the data values stored in the data fields of the historical authorization request messages, along with an indicator of whether the historical authorization request message was approved or declined by the authorizing party. The historical transaction database may also include the reason for receiving a decline. The reason may include at least one of insufficient funds available in the card holder's account and/or the transaction may have been determined to be fraudulent.

As described further herein, data optimization computing device 18 is configured to generate a set of optimization rules based at least in part on the plurality of historical initiated payment transaction records. Data optimization computing device 18 is configured to apply at least a subset of the optimization rules to transform a current transaction authorization request message into an optimized transaction authorization request message. Specifically, data optimization computing device 18 applies the optimization rules to the current transaction authorization request message based on a merchant record for a merchant associated with the current payment transaction. The optimization rules may output or select an optimal value from the plurality of acceptable values within the merchant record to populate the optimizable data fields of the current transaction authorization request message, thereby generating the optimized transaction authorization request message that includes the optimal values.

In the illustrated embodiment, merchant 12 includes a first merchant that has previously registered with data optimization system 100. Registration of the first merchant includes the first merchant authorizing data optimization system 100 to transform a current transaction authorization request message received from the first merchant into an optimized transaction authorization request message, during processing of a current payment transaction. Registration further includes the first merchant providing at least one merchant record associated with a transaction authorization request message that the first merchant is configured to generate during a payment transaction to data optimization system 100. In other words, the first merchant provides different values for each of the optimizable data fields. The different values may be used by the merchant to populate the optimizable data fields when submitting an authorization request message.

During a current payment transaction, merchant 12 transmits a current transaction authorization request message 22 to data optimization computing device 18. Data optimization computing device 18 applies one or more optimization rules to current transaction authorization request message 22 and to the merchant record associated with merchant 12. Data optimization computing device 18 transforms current transaction authorization request message 22 into an optimized transaction authorization request message 24 by replacing (based on the output from the optimization rules) one or more values in current transaction authorization request message 22 with optimal values. In some embodiments, based on the output from the optimization rules, data optimization computing device 18 selects an optimal acquiring bank 14 to which to send optimized transaction authorization request message 24. For example, merchant 12 may be registered with more than one acquiring bank 14. Data optimization computing device 18 may select an optimal acquiring bank 14 from a list of registered acquiring banks associated with merchant 12, which are stored as available values for an optimizable "acquirer" data field. Optimal acquiring bank 14 is associated with an increased likelihood of receiving a positive request outcome (e.g., an approval or authorization) for the optimized transaction authorization request message 24. In some embodiments, data optimization computing device 18 may determine optimal acquiring bank 14 from the list of registered acquiring banks using the output from the optimization rules. In other embodiments, data optimization computing device 18 may determine optimal acquiring bank 14 based on one or more historical initiated payment transaction records retrieved from historical transaction database 300.

Data optimization computing device 18 transmits optimized transaction authorization request message 24 to optimal acquiring bank 14. Acquiring bank 14 appends one or more data fields to optimized transaction authorization request message 24, such as an acquirer party identifier. For clarity, optimized transaction authorization request message 24 including any additional, appended data form the acquiring bank 14 may be referred to herein as an "acquirer authorization request message" 26. Acquiring bank 14 then transmits acquirer authorization request message 26 to payment processing network 20 for transmission to an authorizing party.

In the illustrated embodiment, payment processing network 20 transmits acquirer authorization request message 26 to issuer 16 (i.e., the authorizing party). Issuer 16 processes acquirer authorization request message 26 according to its internal authorization and fraud-detection procedures, using acquirer authorization request message 26 (that is, using optimal values, optimized transaction authorization request message 24 and/or any appended data from acquiring bank 14). The authorization request outcome message may include a positive request outcome (e.g., an approval or authorization) or a negative request outcome (e.g., a decline). Issuer 16 transmits a transaction authorization response message 28, including the authorization request outcome, to payment processing network 20 for transmittal back to acquiring bank 14. Payment processing network 20 transmits transaction authorization response message 28 to acquiring bank 14. Subsequently, acquiring bank 14 transmits transaction authorization response message 28 to merchant 12.

Figure 2:
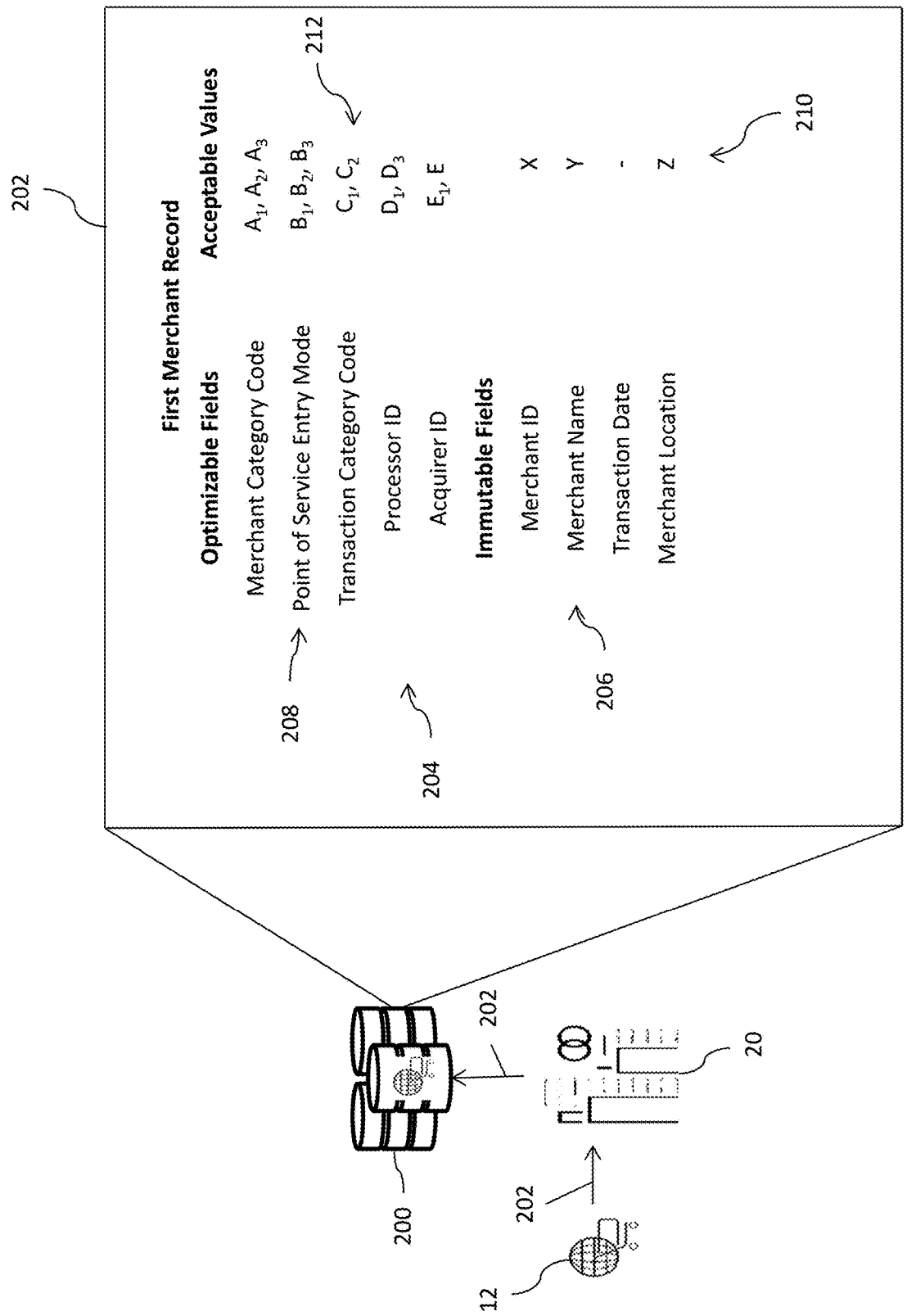

Referring now to FIG. 2, merchant database 200 stores at least one merchant record, and each merchant record is associated with a respective merchant. An example first merchant record 202 obtained from a first merchant (e.g., a merchant 12) registered with data optimization system 100 is shown in detail in FIG. 2. Specifically, merchant 12 registered with data optimization system 100 may provide first merchant record 202 including a plurality of data associated with a transaction authorization request message that the merchant may generate during a payment transaction.

Merchant record 202 includes a plurality of merchant data fields 204. Merchant data fields 204 may include at least one immutable data field 206 and at least one optimizable data field 208. Each of immutable data fields 206 may be populated with an immutable value 210 and/or may be unpopulated. For example, if first merchant 12 only has a single location where a payment transaction may take place, the "merchant location" will be an immutable data field 206, and the "merchant location" data field will be populated with an immutable value 210 indicating the singular location of first merchant 12. Accordingly, in the example first merchant record 202, the "merchant location" data field is populated with an immutable value 210 represented with "F." The "F" represents a value indicating the location of merchant 12. In some cases, one or more immutable data fields 206 such as "transaction date-times" are dynamically populated during a current payment transaction. For each of optimizable data fields 208, merchant record 202 includes one or more acceptable values 212 that may be used to populate each respective optimizable data field 208. In the example first merchant record 202, the "merchant category code" data field has a plurality of acceptable values 212 represented as the values "$A_1$", "$A_2$", or "$A_3$."

Merchant database 200 may include a plurality of merchant records 202 for a single merchant. Merchant database 200 may further include any additional information that enables the data optimization system 100 to function as described herein. Merchant database 200 may be updated based on information periodically received from merchants 12.

Figure 3:
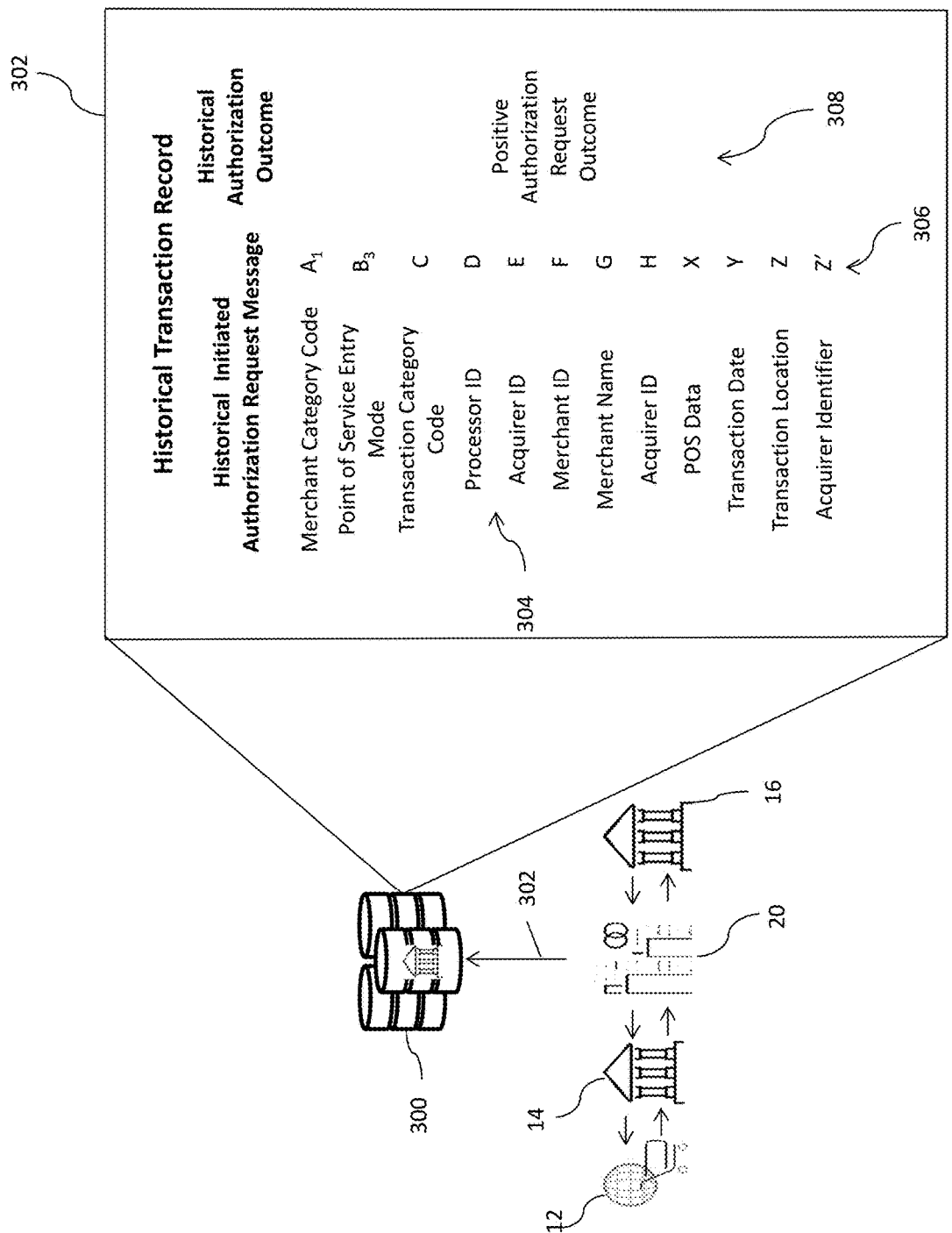

Referring now to FIG. 3, historical transaction database 300 includes a plurality of historical transaction records 302 associated with a respective plurality of initiated payment transactions. Each of historical transaction records 302 is associated with a respective issuer 16. An example historical transaction record 302 obtained from a first issuer 16 is illustrated in FIG. 3. Each historical transaction record 302 includes a plurality of historical transaction data fields 304 populated with a respective historical transaction value 306, a historical authorization request outcome 308. In some cases, historical transaction data fields 304 may include an "acquirer party identifier" data field populated with a value representing the acquiring bank associated with the initiated payment transaction. Historical authorization request outcomes 308 may include one of a positive authorization request outcome (e.g., an approval or authorization) or a negative authorization request outcome (e.g., a decline). Historical authorization request outcomes 308 may include and/or be parsed from authorization response messages generated by an historical authorizing party (e.g., an issuer) in response to respective transaction authorization request messages. In some cases, the negative authorization request outcome may be associated with a legitimate or genuine decline. For example, a cardholder had insufficient funds, or a transaction was correctly identified as fraudulent. In some cases, the negative request outcome may be associated with a false decline. For example, an authorizing party incorrectly identified a non-fraudulent transaction as fraudulent. In some cases a negative authorization request outcome may not be associated with either a false decline or a genuine decline, as this information may be indeterminable from a historical transaction record. In some embodiments, a historical transaction record 302 may further include a reason associated with a negative authorization request outcome. For example, the reason may include at least one of false decline and/or genuine decline, funds decline, or fraud decline.

The illustrated historical transaction record 302 includes a plurality of historical transaction data fields 304 of a respective initiated payment transaction and an associated historical authorization request outcome 308. In this example, the associated historical authorization request outcome 308 includes a positive authorization request outcome. Each of the historical data fields 304 are populated with a respective historical transaction value 306 associated with the respective initiated payment transaction. The historical transaction records 302 may be recorded for previously initiated payment transactions processed over payment processing network 20. In alternative embodiments, the historical transaction records may be obtained from an alternative source. Historical transaction database 300 may further include any additional information related to an initiated historical payment transaction that enables the data optimization system 100 to function as described herein. Historical transaction database 300 may be updated to include additional historical transaction records 302, as frequently as necessary to enable data optimization system 100 to function as described herein.

Figure 4:
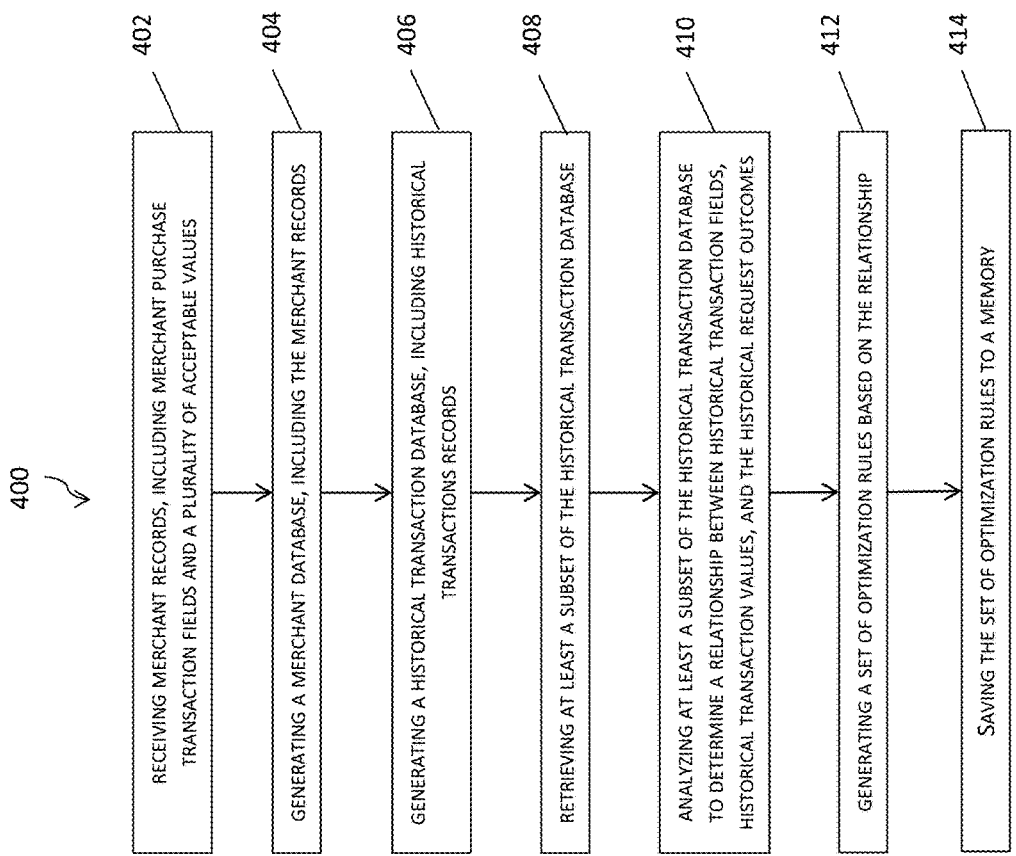

FIG. 4 is a process flowchart of an example method 400 for generating a set of optimization rules. Method 400 may be implemented by data optimization computing device 18, which is configured to apply the set of optimization rules during an ongoing or current payment transaction to optimize a transaction authorization request message associated with the ongoing payment transaction.

Method 400 includes obtaining 402 at least one merchant record (e.g., a merchant record 202, shown in FIG. 2). Obtaining 402 at least one merchant record includes receiving a first message (e.g., a registration message) from a merchant registered or enrolled to participate with the data optimization system 100. The first message includes data that defines the merchant transaction record associated with that merchant. The merchant record may include data such as a plurality of merchant transaction data fields (e.g., merchant transaction data fields 204, also shown in FIG. 2). Each of the merchant transaction data fields may be categorized into at least one of an immutable data field (e.g., immutable data field 206) and/or an optimizable data field (e.g., optimizable data field 208, both shown in FIG. 2). The merchant record may further include a plurality of acceptable values (e.g., acceptable values 212, also shown in FIG. 2) for each of the optimizable data fields.

Method 400 also includes generating 404 a merchant database (e.g., merchant database 200, shown in FIGS. 1 and 2). Generating 404 the merchant database includes storing the at least one merchant record to a memory. The memory may be integral to data optimization computing device 18 or may be separate from data optimization computing device 18 (as shown in FIG. 1).

Method 400 further includes generating 406 a historical transaction database (e.g., historical transaction database 300, shown in FIGS. 1 and 3). Generating 406 the historical transaction database includes storing a plurality of historical transaction records (e.g., historical transaction records 302, shown in FIG. 3) to a memory. The memory may be integral to data optimization computing device 18 or may be separate from data optimization computing device 18 (as shown in FIG. 1). The historical transaction records include at least one historical transaction data field (e.g., historical transaction data fields 304) and an associated historical transaction value 306 (e.g., historical transaction values 306) populating the historical transaction fields, and a historical authorization request outcome (e.g., historical authorization request outcome 308, all shown in FIG. 3).

Method 400 also includes retrieving 408 at least a subset of the historical transaction records. Retrieving 408 includes accessing the memory (i.e., historical transaction database) to retrieve the historical transaction records saved therein.

In addition, method 400 includes analyzing 410 the subset of the historical transaction records 302. To analyze 410 the historical transaction records, data optimization computing device 18 is configured to process the historical transaction fields, historical transaction values, and the historical authorization request outcomes to determine a plurality of relationships. In some embodiments, the relationships may include one of a correlation and/or a covariance between the historical transaction fields, the historical transaction values, and historical authorization request outcomes 308. In some other embodiments, data optimization computing device 18 may identify a relationship by assigning a weight to each of the historical transaction values based on the relative contribution of the historical transaction values to generating a positive request outcome. In alternative embodiments, data optimization computing device 18 may use any method or process to determine the relationship(s) to enable data optimization system 100 to function as described herein.

Method 400 further includes generating 412 a set of first rules (e.g., optimization rules), and saving 414 the set of first rules to a memory. Data optimizing computing device 18 is configured to generate 412 the set of optimization rules based on based on the determined relationship(s) between the historical transaction values and the historical authorization outcomes. As described elsewhere herein, data optimization computing device 18 is configured to apply the optimization rules to transform a current transaction authorization request message into an optimized transaction authorization request message (as shown in greater detail in FIG. 6). An optimization rule may include any number of steps or processes that enable data optimization system 100 to function as described herein. Saving 416 the first set of rules to the memory includes data optimization computing device 18 saving the set of optimization rules to the memory. The memory may be integral to data optimization computing device 18 or may be separate from data optimization computing device 18. For example, data optimization computing device 18 may store the optimization rules in the merchant database and/or the historical transaction database.

Figure 5:
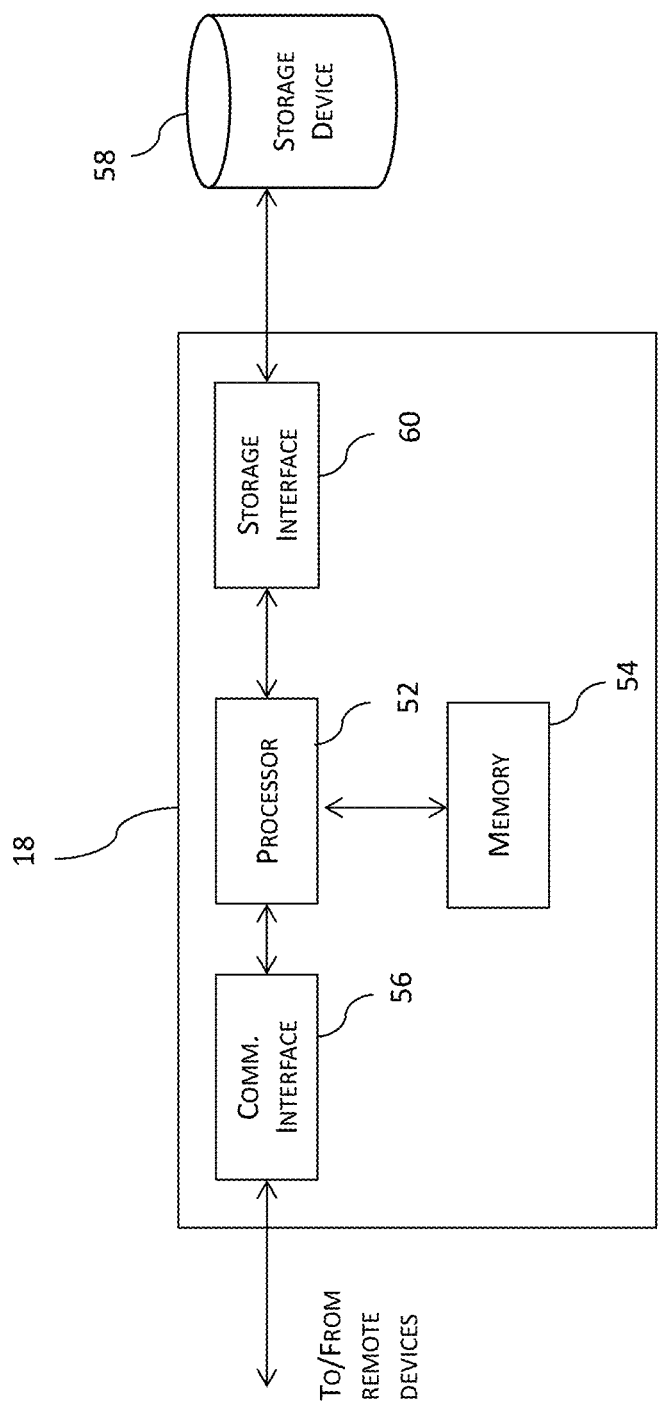

FIG. 5 illustrates an example configuration of a server computing device, such as data optimizing computing device 18. Data optimization computing device 18 includes a processor 52 for executing instructions. Instructions may be stored to a memory 54. Processor 52 may include one or more processing units (e.g., in a multi-core configuration) for executing instructions. The instructions may be executed within a variety of different operating systems on data optimizing computing device 18, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 52 is operatively coupled to a communication interface 56 such that data optimization computing device 18 is capable of communication with remote devices. Processor 52 may also be operatively coupled to a storage device 58. Storage device 58 is any computer-operated hardware suitable for storing and/or retrieving data (e.g., merchant database 200 and/or historical transaction database 300, both shown in FIG. 1). In some embodiments, storage device 58 is integrated in data optimizing computing device 18. For example, data optimizing computing device 18 may include one or more hard disk drives as storage device 58. In other embodiments, storage device 58 is external to data optimizing computing device 18. For example, storage device 58 may include multiple storage units such as hard disks or solid state disks in a redundant array of inexpensive disks (RAID) configuration. Storage device 58 may include a storage area network (SAN) and/or a network attached storage (NAS) system.

In some embodiments, processor 52 is operatively coupled to storage device 58 via a storage interface 60. Storage interface 60 is any component capable of providing processor 52 with access to storage device 58. Storage interface 60 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 52 with access to storage device 58.

Memory 54 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
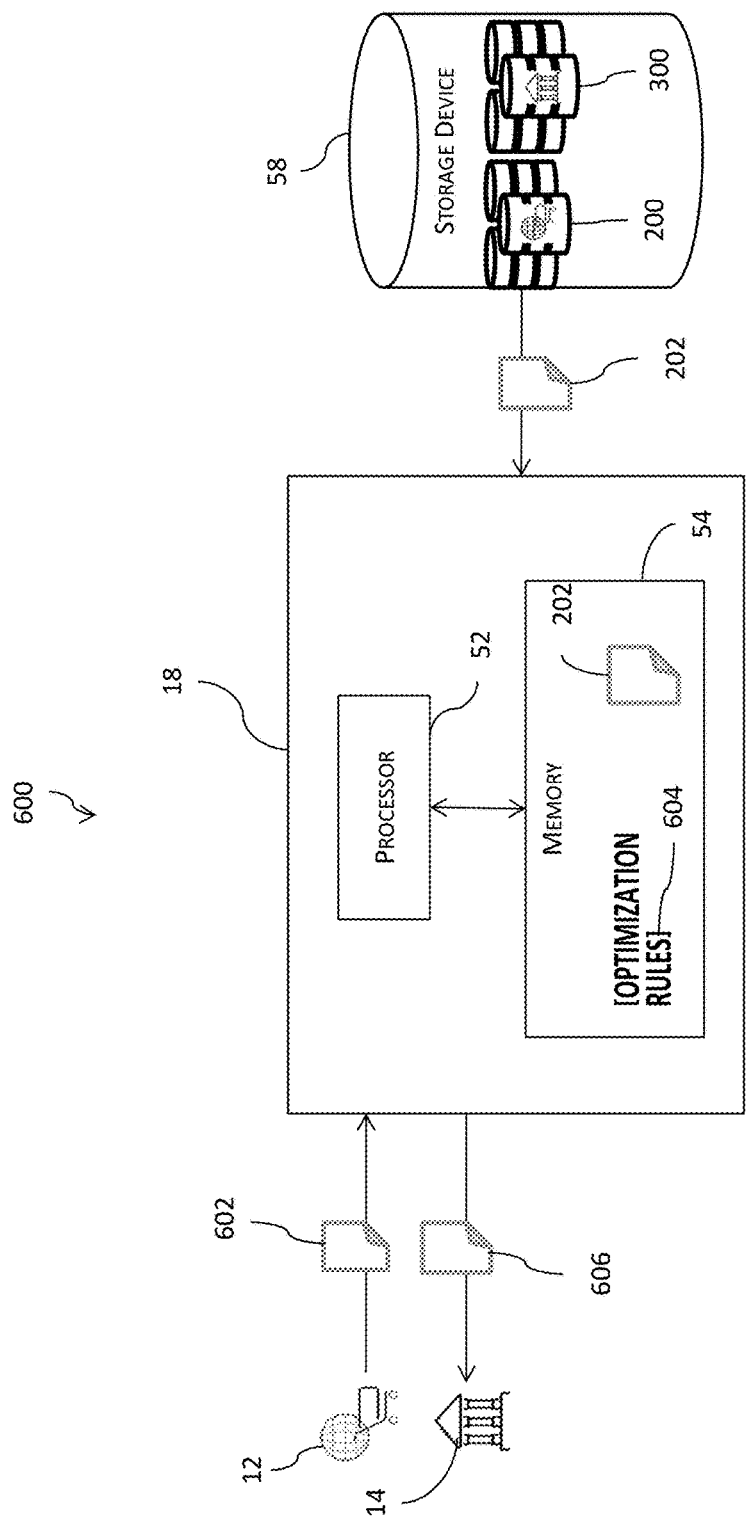

FIG. 6 is a schematic depiction of an example process flow 600 of an ongoing payment transaction. The process flow 600 includes data optimizing computing device 18 receiving a current transaction authorization request message 602 (current transaction authorization request message 602 may be similar to current transaction authorization request message 22 shown in FIG. 1) from first merchant 12 previously registered with data optimization system 100. The current transaction authorization request message is associated with a current ongoing payment transaction initiated at first merchant 12. Data optimization computing device 18 receives the current transaction authorization request message 602. Data optimizing computing device 18 retrieves at least one merchant record 202 associated with the first merchant 12 from the storage device 58 (e.g., from merchant database 200) and locally stores merchant record 202 within memory 54 for local processing thereof. In the illustrated embodiment, data optimization computing device 18 has also stored optimization rules 604 (e.g., optimization rules generated according to method 400, shown in FIG. 4) in memory 54.

Figure 7:
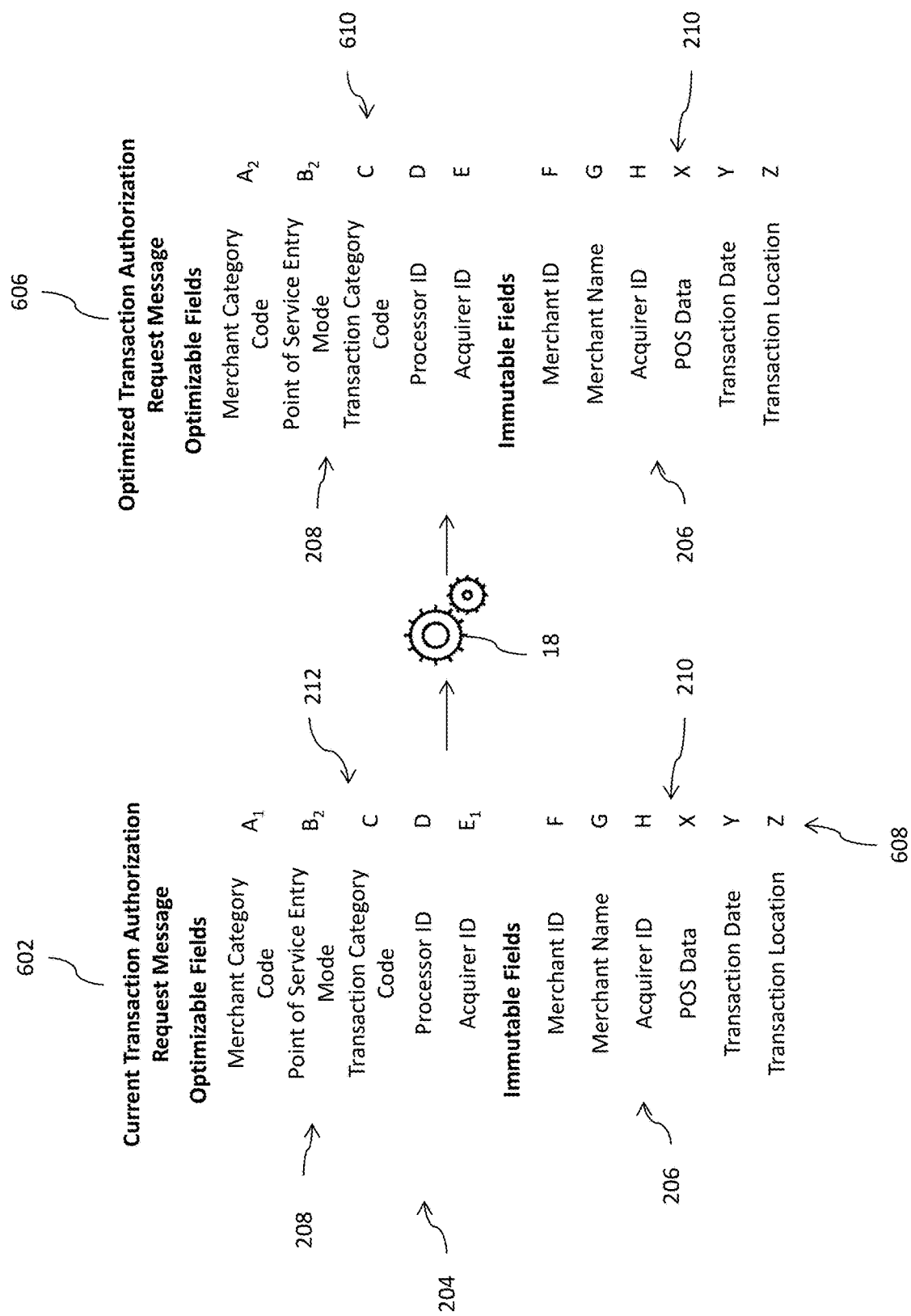

Data optimization computing device 18 is configured to access (e.g., retrieve from the memory 54) at least a subset of optimization rules 604 and merchant record 202, and dynamically (e.g., "on-the-fly") transforms current transaction authorization request message 602 to an optimized transaction authorization request message 606 (shown in further detail in FIG. 7; optimized transaction authorization request message 606 may be similar to optimized transaction authorization request message 24 shown in FIG. 1). More specifically, data optimization computing device 18 is configured to apply at least one optimization rule 604 and merchant record 202 to current transaction authorization request message 602 to identify an optimal value (e.g., an optimal value 610, shown in further detail in FIG. 7) from the plurality of acceptable values (e.g., acceptable values 212, shown in FIG. 2) in merchant record 202 to populate optimizable fields (e.g., optimizable fields 208, also shown in FIG. 2). Applying optimization rules 604 may include, for example and without limitation, removing or adding merchant transaction data fields, populating an optimizable field with an optimal value without consideration of the immutable data fields or immutable values therein, and/or selecting an optimal acquirer to which to transmit optimized transaction authorization request message 606.

Data optimization computing device 18 is configured to generate optimized transaction authorization request message 606 to include a combination of both the selected optimal values in the optimizable data fields and the immutable values. Accordingly, optimized transaction authorization request message 606 includes the optimizable data fields populated with the optimal values and the immutable data fields populated with the immutable values. Data optimizing computing device 18 transmits optimized transaction authorization request message 606 to acquirer 14 (e.g., the optimal acquirer identified based on the output from optimization rules 604).

FIG. 7 is an illustration of an example current transaction authorization request message 602 received from first merchant 12 (shown in FIG. 1) associated with a current payment transaction and an example optimized transaction authorization request message 606 generated by data optimization computing device 18 by applying optimization rules (e.g., optimization rules 604, shown in FIG. 6) to current transaction authorization request message 602. The example current transaction authorization request message 602 includes a plurality of merchant transactions data fields 204. Data optimization computing device 18 is configured to retrieve a first merchant record (e.g., first merchant record 202, shown in FIG. 2) to identify which merchant transaction data fields in current transaction authorization request message 602 are immutable data fields 206 and which are optimizable data fields 208. In the example current transaction authorization request message 602, both immutable data fields 206 and optimizable data fields 208 are populated with current values 608 associated with the current payment transaction. In this example, current values 608 populating immutable data fields 206 are immutable values 210 that may not be changed without altering the accuracy of current transaction authorization request message 602. Optimized transaction authorization request message 606 includes immutable data fields 206 and immutable values 210, which are unchanged from current transaction authorization request message 602. For example, immutable data field 206 "transaction date" is populated with immutable value 210 "Y", in both of current transaction authorization request message 602 and optimized transaction authorization request message 606.

First merchant record 202, (as shown in FIG. 2) also includes a plurality of acceptable values (e.g., acceptable values 212) for each of the optimizable data fields (e.g., optimizable data fields 208). Current values 608 populating the optimizable data fields 208 in the example current transaction authorization request message 602 have been selected from the plurality of acceptable values 212 by the first merchant 12, arbitrarily or according to various internal authorization messages generated procedures.

Data optimization computing device 18 is configured to apply the optimization rules (e.g., optimization rules 604, shown in FIG. 6) to current transaction authorization request message 602 and the acceptable values 212 in merchant record 202 to identify an optimal value 610 (from the plurality of acceptable values 212) to populate each optimizable data field 208 in optimized transaction authorization request message 606. For example, first merchant record 202 indicates that optimizable field 208 of "merchant category code" may be populated with one of acceptable values 212 "$A_1$, $A_2$ or $A_3$". In the current transaction authorization request message 602, the "merchant category code" is populated with a current value 608 of "$A_1$" (also an acceptable value 212). In optimized transaction authorization request message 606, current value 608 of "$A_1$" populating the "transaction category code" has been replaced with an optimal value 610 of "$A_2$" In some instances, the current value 608 populating an optimizable field 208 may already be an optimal value 610. For example, in the current transaction authorization request message 602, optimizable field 208 of "point of service entry mode" is populated with current value 608 of "$B_2$". In optimized transaction authorization request message 606, the "point of service entry mode" field is populated with an optimal value 610 of "$B_2$", which is unchanged from current value 608 populating the "point of service entry mode" field of current transaction authorization request message 602.

In some embodiments, the merchant may be registered with more than one acquiring bank (e.g., acquiring bank 14). A list of acquiring banks associated with the merchant may be included in merchant record 202. For example, the first merchant may be registered with a first acquiring bank having an acquirer ID represented by an "$E_1$" and/or a second acquiring bank having an acquirer ID represented by an "E". Data optimization computing device 18 may select an optimal acquiring bank from at least one of "$E_1$" or "E" using optimization rules. The optimal acquiring bank is associated with an increased likelihood of receiving a positive request outcome (e.g., an approval or authorization) for optimized transaction authorization request message 606. Current transaction authorization request message 602 includes an acquirer ID field populated with a value of "$E_1$" or may include a blank or unpopulated acquirer ID field. In this example, data optimization computing device 18 has determined that "E" is the optimal acquiring bank, and the optimizable data field 208 of acquirer ID is populated with "E" in optimized transaction authorization request message 606. In some other example embodiments, data optimization computing device 18 may select the optimal acquirer based on one or more historical transaction records (e.g., historical transaction record 302) stored in a historical transaction database (e.g., historical transaction database 300). Such historical transaction records may indicate which acquirer(s)

the merchant is registered with based on the merchant having transmitted transaction authorizations to the acquirer(s) in the past.

The optimized transaction authorization request message (e.g., optimized transaction authorization request message 606, shown FIG. 7) may be associated with an increased likelihood of receiving a positive authorization request outcome, compared with the current transaction authorization request message. The increased likelihood of receiving a positive authorization request outcome is based on the plurality of relationships developed using the historical transaction data fields of initiated historical payment transactions and associated historical authorization request outcomes. Increased likelihood of receiving a positive authorization request outcome may improve both the customer and merchant experience while decreasing the loss of sales for a merchant. In addition, optimized transaction authorization request messages may reduce network traffic associated with false declines for repeated transactions.

Figure 8:
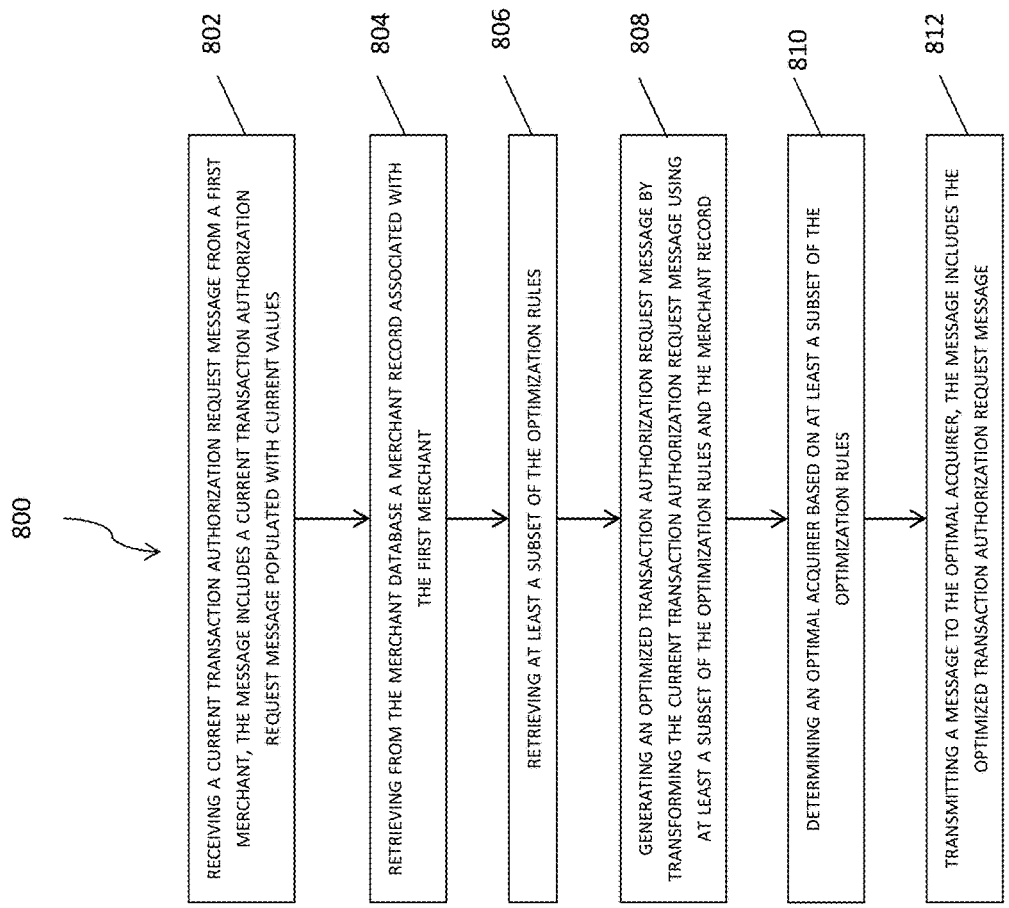

FIG. 8 is a process flow chart of an example method 800 for dynamically generating an optimized authorization request message (e.g. the optimized authorization request message 606, shown in FIG. 5). Method 800 may be implemented by a computing device (e.g., data optimizing computing device 18, shown in FIG. 1), which is configured to apply a set of rules (e.g., optimization rules 604, shown in FIG. 6) during an ongoing or current payment transaction to optimize a current authorization request message (e.g., current transaction authorization request message 602, shown in FIG. 7) associated with the ongoing payment transaction.

Method 800 includes receiving 802 a current authorization request message from a first merchant (e.g., a merchant 12, as shown in FIG. 1). In the example embodiment, the first merchant includes a merchant previously registered to receive the data optimization services of data optimization computing device 18. The current authorization request message includes a plurality of merchant transaction data fields (e.g., merchant transaction data fields 204, shown in FIG. 2). Each of the merchant transaction data fields are populated with current input values (e.g., current transaction values 606, shown in FIG. 7) associated with the ongoing payment transaction.

Method 800 also includes retrieving 804 a merchant record (e.g. merchant record 202, shown in FIG. 2) stored in a memory (e.g., from a merchant database, such as merchant database 200, shown in FIGS. 1 and 2). Retrieving 804 the merchant record includes data optimization computing device 18 retrieving at least one merchant record associated with the first merchant from the merchant database. The memory (and/or the merchant database) may be integral to data optimization computing device 18 or may be separate from data optimization computing device 18. The merchant record may include at least one immutable data field (e.g., an immutable data field 206), at least one optimizable data field (e.g., an optimizable data field 208, both shown in FIG. 2) and a plurality of acceptable values (e.g., acceptable values 212, shown in FIG. 2) for each of the optimizable fields. Data optimization computing device 18 may use data contained within the first merchant record to identify optimizable data fields and immutable data fields included in the current authorization request message.

Method 800 further includes retrieving 806 at least one optimization rule. Retrieving 806 at least one optimization rule includes data optimization computing device 18 retrieving at least a subset of optimization rules stored in the memory. The memory may be integral to data optimization computing device 18 or may be separate from data optimization computing device 18. For example, data optimization computing device 18 may store the optimization rules locally, and/or may store the optimization rules in the merchant database and/or the historical transaction database.

Method 800 also includes dynamically generating 808 an optimized transaction authorization request message (e.g., optimized transaction authorization request message 606, shown in FIGS. 6 and 7). Generating 808 an optimized transaction authorization request message includes data optimization computing device 18 utilizing at least a subset of the optimization rules retrieved 806 from the memory and the first merchant record to populate each of the optimizable data fields (of the current authorization request message) with an optimal value (e.g., optimal value 610). The optimal value is identified from the plurality of acceptable values contained in the merchant record using at least one optimization rule. The optimized transaction authorization request message includes the optimizable data fields populated with the optimized values and the immutable data fields populated with current (or original) values. The optimized transaction authorization request message is associated with an increase in the likelihood of receiving a positive authorization request outcome compared to the current authorization request message.

In some embodiments, method 800 also includes determining 810 an optimal acquirer (e.g., optimal acquirer 14, shown in FIGS. 1 and 6) and transmitting 812 the optimized transaction authorization request message thereto. Determining 810 an optimal acquirer includes data optimization computing device 18 determining an optimal acquirer using at least one optimization rule retrieved from the memory. Transmitting 812 the optimized transaction authorization request message includes data optimization computing device 18 transmitting the optimized transaction authorization request message to the optimal acquirer.

In another example embodiment, data optimization computing device 18 may generate at least one issuer specific historical database, wherein the issuer specific historical database includes historical transaction records and historical authorization request outcomes associated with a specific issuer. The data optimization computing device will generate a set of issuer specific relationships and a set of issuer specific optimization rules associated with at least one issuer specific historical transaction database. The data optimization system receives a current authorization request message and will subsequently identify the issuer associated with the current authorization request message. The data optimization system will retrieve at least a subset of the issuer specific optimization rules associated with the identified issuer. The data optimization computing device will transform the current authorization request message into an optimized transaction authorization request message using the subset of issuer optimized rules associated with the identified issuer.

In certain embodiments, the data optimization computing device is configured to generate a set of optimization rules associated with an acquirer. The data optimization computing device may select an optimal acquirer based using the set of optimization rules associated with an acquirer.

In one embodiment, the data optimization computing device will transmit the optimized transaction authorization request message to an acquirer or the optimal acquirer for further transaction authorization request processing.

As will be appreciated based on the foregoing specification, the above-described embodiments of the disclosure may be implemented using computer programming or engineering techniques including computer software, firmware, hardware or any combination or subset thereof, wherein the technical effect is reducing false issuer declines, thereby reducing unnecessary network traffic involved with the decline messages and/or repeated transaction attempts. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data optimization computer system for optimizing transaction authorization request messages directed to an authorizing party, the transaction authorization request messages being in a message format associated with specified data fields, the computer system comprising:
   a historical transaction database storing a plurality of historical transaction records associated with a respective plurality of initiated payment transactions, each of the historical transaction records associated with a corresponding previously processed transaction authorization request message;
   a merchant database; and
   a data optimization computing device comprising at least one processor in communication with the historical transaction database and the merchant database, the data optimization computing device configured to:
      receive, from a first merchant of a plurality of merchants registered with the data optimization computer system, an identification of i) one or more optimizable data fields, identified by the first merchant, of the specified data fields, wherein a point-of-sale terminal of the first merchant is configured to populate the one or more optimizable data fields with any of a plurality of acceptable values, and ii) each of the plurality of acceptable values, specified by the first merchant, for use in the one or more optimizable data fields;
      store, in the merchant database, a first merchant record including a first merchant identifier of the first merchant, the identified one or more optimizable data fields received from the first merchant, and the identified plurality of acceptable values received from the first merchant;
      access the historical transaction database to retrieve at least a subset of the plurality of historical transaction records;
      analyze the subset of the historical transaction records and the first merchant record to generate a set of optimization rules, wherein the set of optimization rules identifies optimal values to populate the identified optimizable data fields, from the identified acceptable values, to generate an optimized transaction authorization request message, wherein the optimized transaction authorization request message is associated with an improved likelihood of resulting in a positive request outcome;
      receive a current authorization request message associated with a current payment transaction, the current payment transaction having been initiated at the point-of-sale terminal of the first merchant, the current authorization request message including the first merchant identifier and a current input value corresponding to each of the specified data fields;
      retrieve the first merchant record from the merchant database based on the first merchant identifier received in the current authorization request message;
      retrieve at least a subset of the set of optimization rules;
      generate an optimized authorization request message for the current payment transaction by applying the subset of the optimization rules to the current authorization request message, wherein the optimization rules cause replacement of the current input value of at least one of the one or more optimizable data fields with one of the plurality of acceptable values in the retrieved first merchant record; and
   transmit the optimized authorization request message to an authorizing party.

2. The data optimization computer system of claim 1, wherein each historical transaction record further includes an authorization request outcome.

3. The data optimization computer system of claim 1, wherein the plurality of specified data fields includes at least one immutable data field and wherein the optimized authorization request message includes the at least one immutable data field populated with the corresponding current value.

4. The data optimization computer system of claim 1, wherein each of the plurality of historical transaction records includes an authorizing party identifier associated therewith, and wherein the subset of optimization rules is associated with the authorizing party.

5. The data optimization computer system of claim 4, wherein the data optimization computing device is configured to identify the authorizing party identifier associated with the current authorization request message, the identified authorizing party being a current authorizing party.

6. The data optimization computer system of claim 5, wherein the data optimization computing device is configured to retrieve the subset of optimization rules associated with the authorizing party for the current payment transaction and generate an optimized authorization request message for the payment transaction using the optimization rules associated with the authorizing party.

7. The data optimization computer system of claim 1, wherein each of the plurality of historical transaction records includes an acquirer identifier of a respective acquirer associated with each respective initiated payment transaction.

8. The data optimization computer system of claim 7, wherein the data optimization computing device is configured to generate a second subset of the set of optimization rules, wherein the second subset of optimization rules identifies an optimal acquirer to transmit the optimized transaction authorization request message.

9. The data optimization computer system of claim 1, wherein the data optimization computing device is further configured to receive an authorization request outcome message from an authorizing party, wherein the authorization request outcome message includes an indicator of whether the optimized transaction authorization request message was approved or declined.

10. The data optimization computer system of claim 9, wherein the data optimization computing device is further configured to transmit the authorization request outcome message to an optimal acquirer.

11. A computer-implemented method for optimizing transaction authorization request messages directed to an authorizing party, the transaction authorization request messages being in a message format associated with specified data fields, the method implemented using a data optimization computing device including a processor and a memory, the data optimization computing device in communication with a historical transaction database and a merchant database, the method comprising:
    receiving, from a first merchant of a plurality of merchants registered with a data optimization computer system, an identification of i) one or more optimizable data fields, identified by the first merchant, of the specified data fields, wherein a point-of-sale terminal of the first merchant is configured to populate the one or more optimizable data fields with any of a plurality of acceptable values, and ii) each of the plurality of acceptable values, specified by the first merchant for use in the one or more optimizable data fields;
    storing, in the merchant database, a first merchant record including a first merchant identifier of the first merchant, the identified one or more optimizable data fields received from the first merchant, and the identified plurality of acceptable values received from the first merchant;
    accessing the historical transaction database to retrieve at least a subset of a plurality of historical transaction records stored therein, the plurality of historical transaction records associated with a respective plurality of initiated payment transactions, each of the historical transaction records associated with a corresponding previously processed transaction authorization request message;
    analyzing the subset of the historical transaction records and the first merchant record to generate a set of optimization rules, wherein the set of optimization rules identifies optimal values to populate the identified optimizable data fields, from the identified acceptable values, to generate an optimized transaction authorization request message, wherein the optimized transaction authorization request message is associated with an improved likelihood of resulting in a positive request outcome;
    receiving a current authorization request message associated with a current payment transaction, the current payment transaction having been initiated at the point-of-sale terminal of the first merchant, the current authorization request message including the first merchant identifier and a current input value corresponding to each of the specified data fields;
    retrieve the first merchant record from the merchant database based on the first merchant identifier received in the current authorization request message;
    retrieving at least a subset of the set of optimization rules;
    generating an optimized authorization request message for the current payment transaction by applying the subset of the optimization rules to the current authorization request message, wherein the optimization rules cause replacement of the current input value of at least one of the one or more optimizable data fields with one of the plurality of acceptable values in the retrieved first merchant record; and
    transmitting the optimized authorization request message to an authorizing party.

12. The computer-implemented method of claim 11, wherein the plurality of specified data fields include at least one immutable data field and wherein the optimized authorization request message includes the at least one immutable data field populated with the corresponding current value.

13. The computer-implemented method of claim 11, further comprising receiving an authorization request outcome message from an authorizing party, wherein the authorization request outcome message includes an indicator of whether the optimized transaction authorization request message was approved or declined.

14. The computer-implemented method of claim 11, wherein each of the plurality of historical transaction records includes an authorizing party identifier associated therewith, and wherein the subset of optimization rules is associated with the authorizing party.

15. The computer-implemented method of claim 14, the method further comprising identifying the authorizing party identifier associated with the current authorization request message, the identified authorizing party being a current authorizing party.

16. The computer-implemented method of claim 15, the method further comprising retrieving the subset of optimization rules associated with the authorizing party for the current payment transaction and generate an optimized authorization request message for the payment transaction using the optimization rules associated with the authorizing party.

17. A non-transitory computer-readable storage medium that includes computer-executable instructions for dynamically optimizing transaction authorization request messages directed to an authorizing party, the transaction authorization request messages being in a message format associated with specified data fields, wherein when executed by a data optimization computing device comprising a processor in communication with a memory device and a merchant database, the computer-executable instructions cause the processor to:
    receive, from a first merchant of a plurality of merchants registered with a data optimization computer system, an identification of i) one or more optimizable data fields, identified by the first merchant, of the specified data fields, wherein a point-of-sale terminal of the first merchant is configured to populate the one or more optimizable data fields with any of a plurality of acceptable values, and ii) each of the plurality of acceptable values specified by the first merchant for use in the one or more optimizable data fields;

store, in the merchant database, a first merchant record including a first merchant identifier of the first merchant, the identified one or more optimizable data fields received from the first merchant, and the identified plurality of acceptable values received from the first merchant;

access a historical transaction database to retrieve at least a subset of a plurality of historical transaction records stored therein, the plurality of historical transaction records associated with a respective plurality of initiated payment transactions, each of the historical transaction records associated with a corresponding previously processed transaction authorization request message;

analyze the subset of the historical transaction records and the first merchant record to generate a set of optimization rules, wherein the set of optimization rules identifies optimal values to populate the identified optimizable data fields, from the identified acceptable values, to generate an optimized transaction authorization request message, wherein the optimized transaction authorization request message is associated with an improved likelihood of resulting in a positive request outcome;

receive a current authorization request message associated with a current payment transaction, the current payment transaction having been initiated at the point-of-sale terminal of the first merchant, the current authorization request message including the first merchant identifier and a current input value corresponding to each of the specified data fields;

retrieve the first merchant record from the merchant database based on the first merchant identifier received in the current authorization request message;

retrieve at least a subset of the set of optimization rules;

generate an optimized authorization request message for the current payment transaction by applying the subset of the optimization rules to the current authorization request message, wherein the optimization rules cause replacement of the current input value of at least one of the one or more optimizable data fields with one of the plurality of acceptable values in the retrieved first merchant record; and transmit the optimized authorization request message to an authorizing party.

18. The non-transitory computer-readable storage medium of claim 17, wherein the plurality of specified data fields include at least one immutable data field and wherein the optimized authorization request message includes the at least one immutable data field populated with the corresponding current value.

19. The non-transitory computer-readable storage medium of claim 18, wherein each optimization rule includes one or more steps to identify an optimal value from the acceptable values, wherein the set of optimization rules determines the optimal value to populate the optimizable data fields, and wherein the optimized authorization request message includes the optimizable data fields populated with the optimal values and the immutable data fields populated with a current value.

20. The non-transitory computer-readable storage medium of claim 17, wherein each of the plurality of historical transaction records includes an authorizing party identifier associated therewith, and wherein the subset of optimization rules is associated with the authorizing party.

21. The non-transitory computer-readable storage medium of claim 20, wherein the computer-executable instructions further cause the processor to identify the authorizing party identifier associated with the current authorization request message, the identified authorizing party being a current authorizing party.

\* \* \* \* \*